(12) United States Patent
Chai

(10) Patent No.: US 9,366,932 B2
(45) Date of Patent: Jun. 14, 2016

(54) TFT-LCD ARRAY SUBSTRATE MANUFACTURING METHOD AND LCD PANEL/DEVICE PRODUCED BY THE SAME

(71) Applicant: Shenzhen China Star Optoelectronics Technology Co., Ltd., Shenzhen, Guangdong (CN)

(72) Inventor: Li Chai, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 100 days.

(21) Appl. No.: 14/234,340

(22) PCT Filed: Oct. 21, 2013

(86) PCT No.: PCT/CN2013/085597
§ 371 (c)(1),
(2) Date: Jan. 22, 2014

(87) PCT Pub. No.: WO2015/043023
PCT Pub. Date: Apr. 2, 2015

(65) Prior Publication Data
US 2015/0085219 A1    Mar. 26, 2015

(30) Foreign Application Priority Data
Sep. 24, 2013  (CN) .......................... 2013 1 0439974

(51) Int. Cl.
*G02F 1/1333* (2006.01)
*G02F 1/1368* (2006.01)
*G02F 1/1362* (2006.01)

(52) U.S. Cl.
CPC .... *G02F 1/1368* (2013.01); *G02F 2001/13625* (2013.01)

(58) Field of Classification Search
CPC .............. H01L 27/1288; H01L 27/127; H01L 27/1262; H01L 27/3248; H01L 29/4908; H01L 29/66765; H01L 29/458; H01L 29/41733; H01L 29/45; H01L 29/78618; H01L 29/768; H01L 29/78669; H01L 29/78678; H01L 29/78693; H01L 21/32139; H01L 21/0273; H01L 21/31144; H01L 21/2855; H01L 21/30604; H01L 21/441; H01L 21/47; H01L 21/76802; H01L 21/76877; H01L 51/5212; G02F 2001/136236; G02F 2001/136231; G02F 2001/13629; G02F 2001/13625; G02F 2001/136295; G02F 2001/133357; G02F 1/0316; G02F 1/13; G02F 1/136; G02F 1/136227; G02F 1/136277; G02F 1/1368; G02F 1/136286; G02F 1/1362; G02F 1/1333; G02F 1/13345; G02F 1/133602; G02F 1/133615; G02F 1/133514; G02F 1/134309; G02F 2201/123; G02F 2201/48; G02F 2201/50; C23F 1/30
USPC ...................... 257/59, 72, E21.414, E27.111, 257/E21.158, E33.004, 57, E21.001, 257/E21.409, E29.273, E21.412, E29.151, 257/E29.291, E33.062, E21.002, E21.02, 257/E21, 19, E21.582, E29.294, E51.005; 438/158, 151, 30, 149, 585, 586; 349/43, 46, 138, 139, 187, 106, 65, 349/141; 252/79.1

See application file for complete search history.

(56) References Cited

U.S. PATENT DOCUMENTS

| | | | | |
|---|---|---|---|---|
| 5,966,589 | A * | 10/1999 | Watanabe | ........... G02F 1/13458 257/E27.111 |
| 8,913,220 | B2 * | 12/2014 | Kim | ..................... H01L 27/1288 349/138 |
| 2001/0040648 | A1 * | 11/2001 | Ono | .................. G02F 1/134363 349/43 |

(Continued)

*Primary Examiner* — Thoi Duong
(74) *Attorney, Agent, or Firm* — Andrew C. Cheng

(57) ABSTRACT

The present invention teaches a TFT-LCD array substrate manufacturing method: a) forming a gate electrode, a gate electrode insulator layer, an active layer, a source electrode and a drain electrode, a passivation layer, and a passivation layer via on top of the drain electrode on a glass substrate; b) depositing an ITO film on the glass substrate processed by the step a), removing through exposure and development the photo resist in a TFT area outside the passivation layer via and a part of the photo resist in a pixel area where gaps are to be formed, and revealing the ITO film outside the passivation layer via in the TFT area; c) removing a remaining photo resist in the pixel area where gaps are to be formed using a fourth dry etch, so that the ITO film on the gaps to be formed is revealed; d) removing the revealed ITO film using a third wet etch; and e) peeling the photo resist not yet removed, and forming an ITO electrode that is connected to the passivation layer via. The present invention also teaches a LCD panel and a LCD device having a TFT-LCD array substrate manufactured by foregoing method.

13 Claims, 5 Drawing Sheets

(56) References Cited

U.S. PATENT DOCUMENTS

| | | | |
|---|---|---|---|
| 2005/0142714 A1* | 6/2005 | Chae | H01L 27/124 438/197 |
| 2006/0146256 A1* | 7/2006 | Ahn | G02F 1/134309 349/141 |
| 2007/0138471 A1* | 6/2007 | Lim | H01L 27/1214 257/59 |

* cited by examiner

TFT-LCD ARRAY SUBSTRATE MANUFACTURING METHOD AND LCD PANEL/DEVICE PRODUCED BY THE SAME

BACKGROUND OF THE INVENTION

1. Field of the Invention

The present invention relates to the field of TFT-LCD (Thin Film Transistor Liquid Crystal Display) techniques, and in particular to a TFT-LCD array substrate's manufacturing method, and a LCD panel and a LCD device using the array substrate.

2. The Related Arts

Following the development of information society, demands for flat-panel display are rapidly growing. TFT-LCD has advantages such as small form factor, low power consumption, zero radiation, etc., and therefore has a leading position in the flat-panel display market. However, due to the intense competition among manufacturers, enhancing display quality, increasing yield, and lowering production cost become key survival factors for manufacturers in the intense competition.

The mainstream manufacturing methods for a TFT-LCD array substrate are the so-called 4Mask and 5Mask techniques. The 5Mask technique involves the applications of a Gate Mask, an Active Mask, an S/D Mask, a Via Hole Mask, and a Pixel Mask. Each of the aforementioned masking process further involves steps of Thin Film Deposition, Etching (including Dry Etch and Wet Etch), and Peeling. Therefore, a complete manufacturing process involves 5 cycles of Thin Film Deposition, Masking, Etching, and Peeling.

Developed from the 5Mask technique, the 4Mask technique uses a Gray Tone Mask, or a Half Tone Mask, or a Single Slit Mask (SSM) to combine the Active Mask and the S/D Mask into a single mask. Then, by adjusting the Etching step, a single masking step can achieve the same effect originally requiring two masking steps of the Active Mask and the S/D Mask.

However, no matter whether the 4Mask technique or the 5Mask technique is used, the minimum gap in an ITO (Indium Tin Oxide) pattern formed using ITO mask is 2.25 um. For a smaller gap, the ITO pattern would suffer the problem of not being able to be broken up by etching at places corresponding to the smaller gaps. The current design and manufacturing technique also cannot reduce the gaps in an ITO pattern any smaller. It is also difficult to enhance the transmittance of a TFT-LCD array substrate by reducing the gaps in the ITO pattern.

SUMMARY OF THE INVENTION

To address the technical issue of the prior art described above, an objective of the present invention is to provide a TFT-LCD array substrate manufacturing method. The method contains the steps of: a) forming a gate electrode, a gate electrode insulator layer, an active layer comprising an amorphous silicon layer and an ohmic contact layer, a source electrode and a drain electrode on top of the active layer, a passivation layer, and a passivation layer via on top of the drain electrode sequentially on a glass substrate; b) depositing an ITO film on the glass substrate processed by the step a), coating a photo resist on the ITO film, and, through exposure and development, removing the photo resist in a TFT area outside the passivation layer via and a part of the photo resist in a pixel area where gaps are to be formed so as to reveal the ITO film outside the passivation layer via; c) removing a remaining photo resist in the pixel area where gaps are to be formed from the step b) using a fourth dry etch, so that the ITO film on the gaps to be formed is revealed; d) removing the ITO film revealed by the steps b) and c) using a third wet etch; and e) peeling the photo resist not yet removed, and forming an ITO electrode that is connected to the passivation layer via.

The step a) contains the following steps: a1) depositing a gate electrode metallic film on the glass substrate, and forming the gate electrode using exposure, development, a first wet etch, and peeling; a2) depositing an insulator film, an amorphous silicon film, and a doped amorphous silicon film sequentially on the glass substrate processed after the step a1), and forming the gate electrode insulator layer and the active layer comprising the amorphous silicon layer and the ohmic contact layer using exposure, development, a first dry etch, and peeling; a3) depositing a source/drain electrode metallic film on the glass substrate processed after the step a2), and forming the source electrode and the drain electrode using exposure, development, and a second wet etch, a second dry etch, and peeling; and a4) depositing the passivation layer on the glass substrate processed after the step a3), and forming the passivation layer via above the drain electrode on the passivation layer using exposure, development, a third dry etch, and peeling.

Alternatively, the step a) contains the following steps: a1) depositing a gate electrode metallic film on the glass substrate, and forming the gate electrode using exposure, development, a first wet etch, and peeling; a3) depositing an insulator film, an amorphous silicon film, a doped amorphous silicon film, and a source/drain electrode metallic film sequentially on the glass substrate processed after the step a1), and forming the gate electrode insulator layer, the active layer comprising the amorphous silicon layer and the ohmic contact layer, the source electrode, and the drain electrode using exposure, development, a second wet etch, a first dry etch, a third wet etch, a second dry etch, and peeling; and a4) depositing the passivation layer on the glass substrate processed after the step a3), and forming the passivation layer via above the drain electrode on the passivation layer using exposure, development, a third dry etch, and peeling.

The step a1) contains the following steps: a11) depositing the gate electrode metallic film on the glass substrate that is cleaned, and coating a photo resist on the gate electrode metallic film; a12) exposing and developing the photo resist coated on the gate electrode metallic film in the step a11), and revealing a part of the gate electrode metallic film that is outside where the gate electrode is to be formed; a13) removing the part of the gate electrode metallic film revealed by the step a12) using the first wet etch; and a14) peeling and removing a part of the photo resist that is at where the gate electrode is to be formed, and forming the gate electrode.

The step a2) contains the following steps: a21) depositing the insulator film, the amorphous silicon film, and the doped amorphous silicon film sequentially on the glass substrate processed after the step a1), and coating a photo resist on the doped amorphous silicon film; a22) exposing and developing the photo resist coated on the doped amorphous silicon film in the step a21), and revealing the doped amorphous silicon film in the pixel area; a23) removing the revealed doped amorphous silicon film in the pixel area and the amorphous silicon film beneath it; and a24) peeling and removing a part of the photo resist that is in the TFT area, and forming the gate electrode insulator layer and the active layer comprising the amorphous silicon layer and the ohmic contact layer.

The step a3) contains the following steps: a31) depositing the source/drain electrode metallic film on the glass substrate processed after the step a2), and coating a photo resist on the source/drain electrode metallic film; a32) exposing and developing the photo resist coated on the source/drain electrode metallic film in the step a31), and revealing the source/drain electrode metallic film above where a ditch is to be formed and the source/drain electrode metallic film in the pixel area; a33) removing the source/drain electrode metallic film revealed by the step a32) using the second wet etch; a34) removing a part of the doped amorphous silicon film and the amorphous silicon film beneath it in the to-be-formed ditch using the second dry etch so that the to-be-formed ditch reaches the amorphous silicon layer; and a35) peeling and removing a part of the photo resist that is at where the ditch is to be formed in the TFT area, and forming the source electrode and the drain electrode.

Alternatively, the step a3) contains the following steps: a31) depositing the insulator film, the amorphous silicon film, and the doped amorphous silicon film sequentially on the glass substrate processed after the step a1), and coating a photo resist on the doped amorphous silicon film; a32) exposing and developing the photo resist coated on the doped amorphous silicon film in the step a31), removing a part of the photo resist at where a ditch is to be formed, removing the entire photo resist in the pixel area, and revealing the source/drain electrode metallic film in the pixel area; a33) removing the source/drain electrode metallic film revealed by the step a32) using the second wet etch; a34) removing the photo resist that is at which the ditch is to be formed remained from the step a32) using the first dry etch, and revealing the source/drain metallic film at where the ditch is to be formed; a35) removing the source/drain metallic film revealed by the step a34) using the third wet etch, and revealing the doped amorphous silicon film at where the ditch is to be formed; a36) removing a part of the doped amorphous silicon film and the amorphous silicon film beneath it revealed in the step a35) using the second dry etch so that the to-be-formed ditch reaches the amorphous silicon layer; and a37) peeling and removing a part of the photo resist that is outside where the ditch is to be formed in the TFT area, and forming the gate electrode insulator layer, the active layer comprising the amorphous silicon layer and the ohmic contact layer, the source electrode, and the drain electrode.

The step a4) contains the following steps: a41) depositing a passivation layer film on the glass substrate 21 processed after the step a3), and coating a photo resist on the passivation layer film; a42) exposing and developing the photo resist coated on the passivation layer film in the step a41), and revealing the passivation layer film outside where the passivation layer via is to be formed; a43) removing the passivation layer film revealed by the step a42) using the third dry etch; and a44) peeling and removing a part of the photo resist that is outside where the passivation layer via is to be formed, and forming the passivation layer via.

Another objective of the present invention is to provide a LCD panel containing a TFT-LCD array substrate, a Color Filter substrate opposing the TFT-LCD array substrate, and a liquid crystal layer sandwiched between the TFT-LCD array substrate and the Color Filter substrate. The TFT-LCD array substrate is produced according to the TFT-LCD array substrate manufacturing method described above.

Yet another objective of the present invention is to provide a LCD device containing a LCD panel, and a backlight module opposing the LCD panel and providing illumination for the LCD panel's manifestation of images. The LCD panel is the LCD panel describe above.

For the TFT-LCD array substrate manufacturing method, the LCD panel, and the LCD device of the present invention, as an additional dry etch process is added in the step forming the ITO electrode, the subsequent wet etches therefore are able to effectively reduce the gaps in the ITO electrode pattern in the pixel area, thereby enhancing the transmittance of the TFT-LCD array substrate and reducing the production cost.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

A TFT-LCD array substrate according to the present invention mainly contains pixels for showing images and the TFTs for controlling data entry into the pixels. The present invention involves improvements to the two's manufacturing method. Detailed description to the embodiments of the present invention is as follows.

Figure 1:
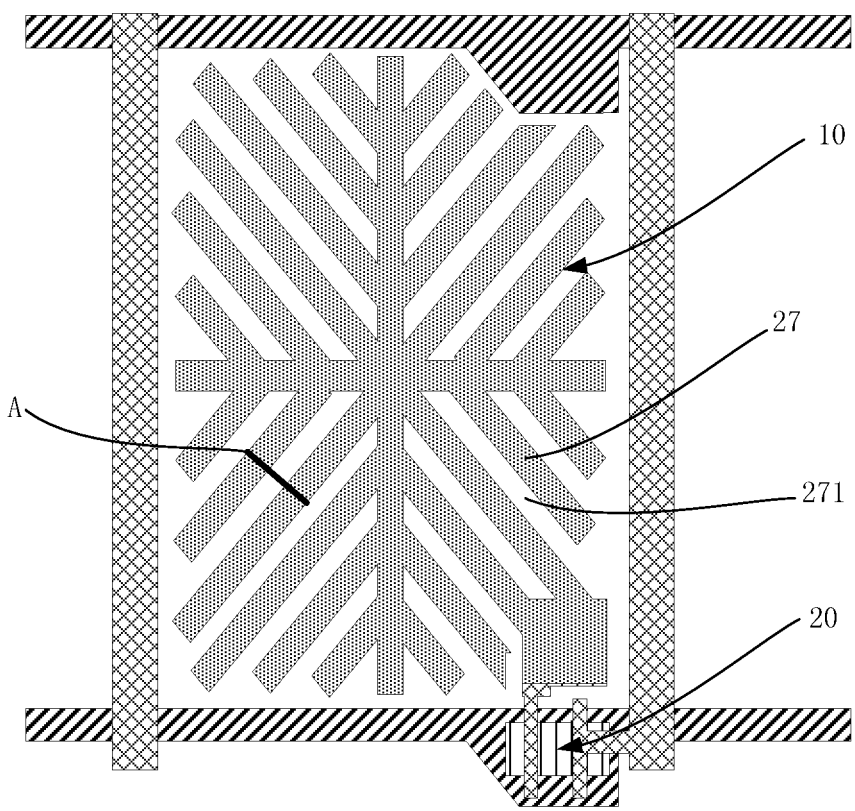
FIG. 1 is a top view diagram showing a TFT-LCD array substrate manufactured according to an embodiment of the present invention.
Figure 2:
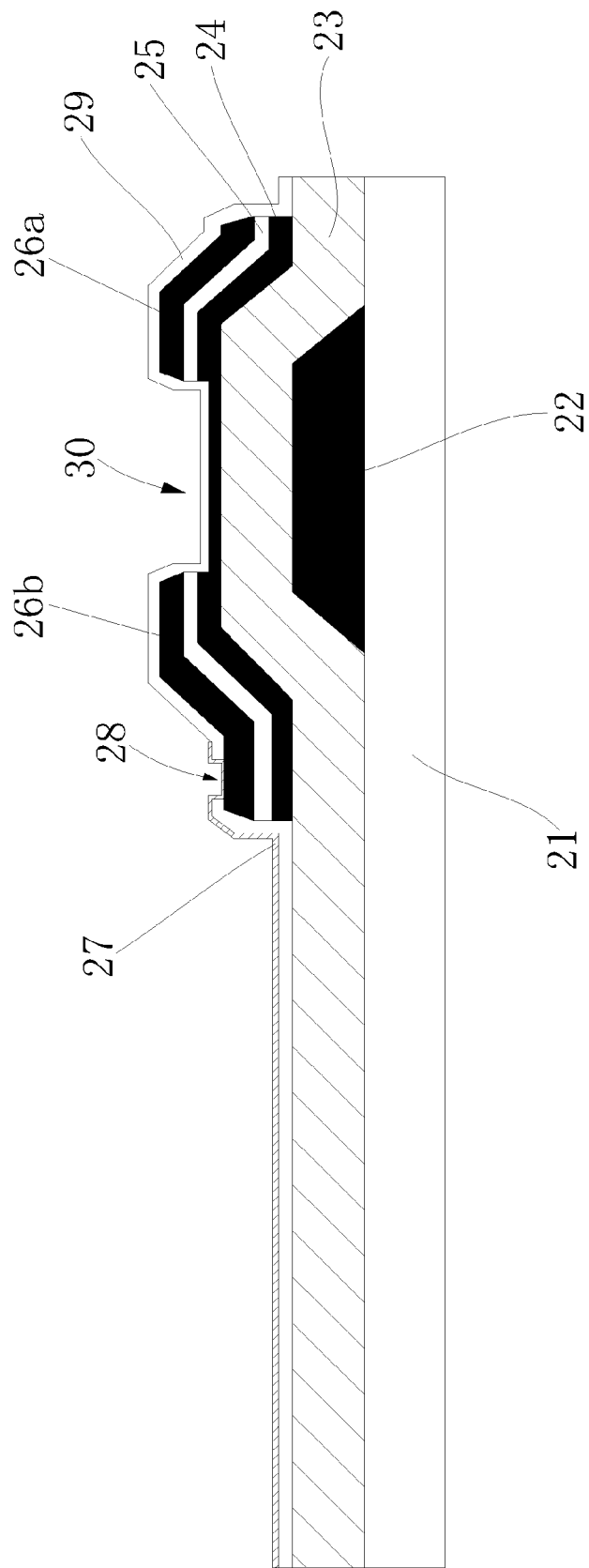
FIG. 2 is a sectional diagram showing the TFT-LCD array substrate of FIG. 1.

FIG. 1 is a top view diagram showing a TFT-LCD array substrate manufactured according to the present invention. In FIG. 1, only a pixel and a TFT are depicted. It should be understandable that a TFT-LCD array substrate contains multiple pixels and TFTs as shown in FIG. 1 arranged in an array. FIG. 2 is a sectional diagram showing the TFT-LCD array substrate of FIG. 1.

As illustrated in FIGS. 1 and 2, a TFT-LCD array substrate manufactured according to the present invention contains pixels 10 for showing images and the TFTs 20 for controlling data entry into the pixels 10. The area where a pixel 10 is located is called a pixel area, and the area where a TFT 20 is located is called a TFT area. Specifically, the TFT 20 contains the following components sequentially formed on a glass substrate 21: a gate electrode 22, a gate electrode insulator layer 23, an active layer containing an amorphous silicon layer 24 and an ohmic contact layer 25, a source electrode (metallic layer) 26a and a drain electrode (metallic layer) 26b on top of the active layer, a passivation layer 29, a passivation layer via 28 on top of the drain electrode 26b through the passivation layer 29, and a transparent pixel electrode (i.e., ITO electrode) 27. The pixel 10 contains the following components sequentially formed on a glass substrate 21: a gate electrode insulator layer 23, a passivation layer 29, and an ITO electrode 27 on top of the passivation layer 29. The ITO electrode 27 in the pixel area usually manifests a star shaped ITO electrode pattern and there are gaps 271 in the ITO electrode pattern.

Figure 3:
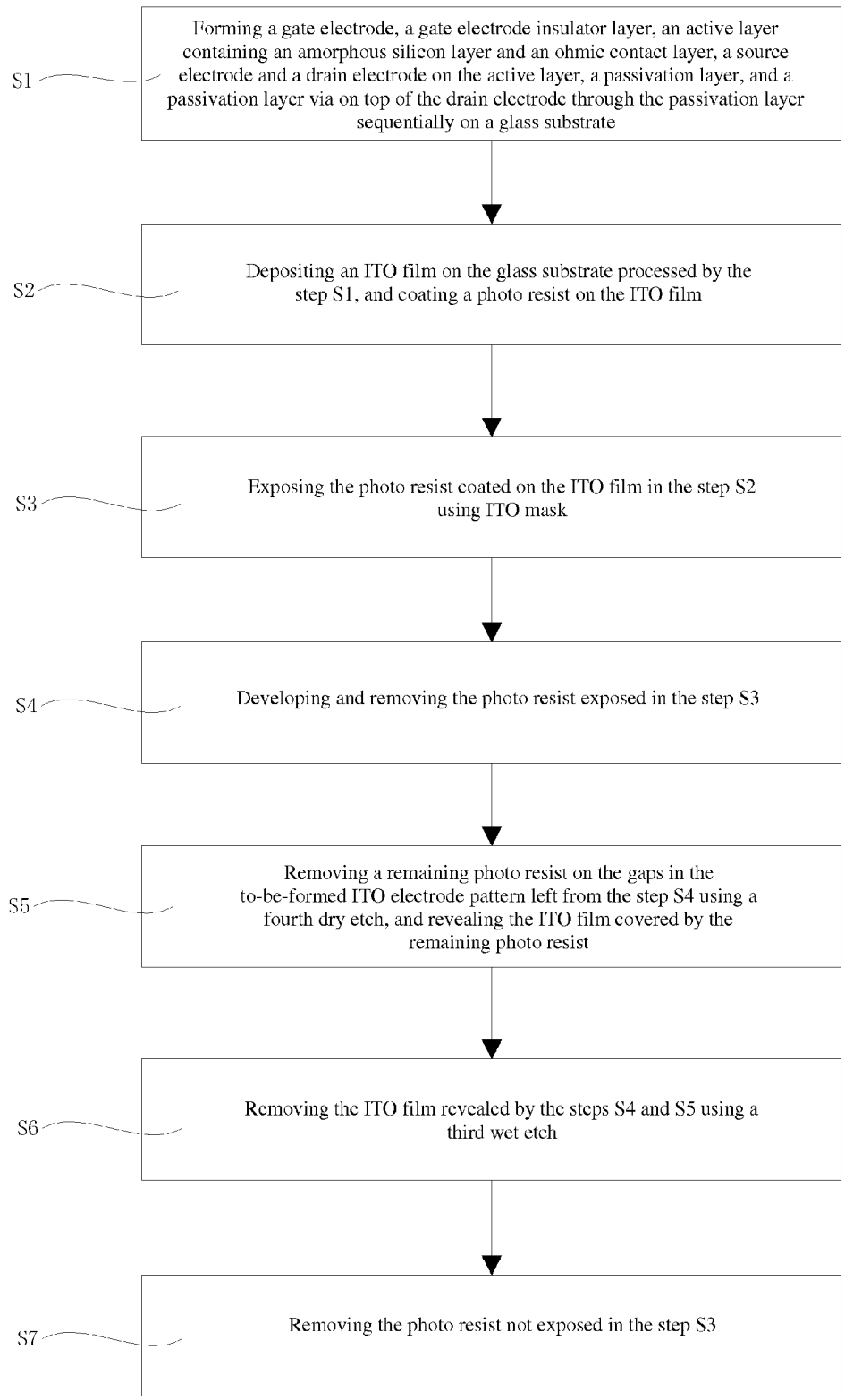
FIG. 3 is flow diagram showing the steps of a TFT-LCD array substrate manufacturing method according to an embodiment of the present invention.

In the following, a manufacturing method of the present invention to the TFT-LCD array substrate, i.e., to the pixels 10 and the TFTs 20, is described. FIG. 3 is flow diagram showing the steps of the TFT-LCD array substrate manufacturing method according to an embodiment of the present invention. FIGS. 4a to 4e depict a scenario of forming the ITO electrode pattern in a pixel area according to the method of FIG. 3, and what is shown in FIGS. 4a to 4e is the cross-section along the A line of FIG. 1.

Together with FIGS. 2 and 3, the TFT-LCD array substrate manufacturing method contains the following steps.

In step S1, a gate electrode 22, a gate electrode insulator layer 23, an active layer containing an amorphous silicon layer 24 and an ohmic contact layer 25, a source electrode (metallic layer) 26a and a drain electrode (metallic layer) 26b on top of the active layer, a passivation layer 29, and a passivation layer via 28 on top of the drain electrode 26b through the passivation layer 29 are sequentially formed on a glass substrate 21.

Figure 4A:
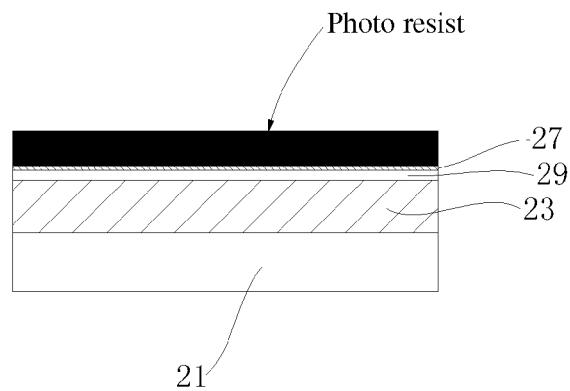
FIGS. 4a to 4e are cross-sectional diagrams along the A line of FIG. 1 showing a scenario of forming an ITO electrode pattern in a pixel area according to the method of FIG. 3.

In step S2, an ITO film is deposited on the glass substrate 21 after being processed by the step S1, and a photo resist is coated on the ITO film. The state of the pixel area is shown in FIG. 4a.

In step S3, the photo resist coated on the ITO film in the step S2 is exposed using an ITO mask and UV (ultra violet) ray. The part of the photo resist exposed to the UV ray turns acid from neutral, and the other part not exposed to the UV ray remains neutral. The ITO mask can be the Single Slit Mask (SSM), the Gray Tone Mask, or the Half Tone Mask used in a 4Mask process in a step of forming the active layer and source/drain electrode. Through the UV ray's interference and diffraction, a translucent pattern area is formed on the ITO mask. During exposure, UV ray can only partially penetrate the translucent area. By controlling the exposure, a part of the photo resist can be partially exposed, and some other part of the photo resist can be fully exposed. After development, the fully exposed area does not have photo resist, the partially exposed area has the photo resist thinner than that in a no exposure area. After this step, in the TFT area, the photo resist coated in the passivation layer via 28 and its vicinity is not exposed, and the photo resist coated in the other area is fully exposed. In the pixel area, the photo resist coated on the desired ITO electrode 27 is not exposed, and the photo resist coated in the gaps 271 among the ITO electrode pattern is partially exposed.

Figure 4B:
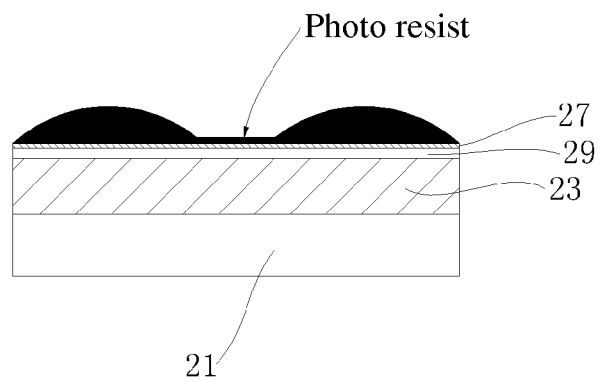

In step S4, the photo resist processed by the step S3 is developed for removing the exposed photo resist (i.e., the photo resist that turns acid) using, for example, alkaline developing solution. Therefore, the photo resist coated in the other area is removed, and the photo resist coated in the gaps 271 among the ITO electrode pattern in the pixel area is removed. The state of the pixel area is shown in FIG. 4b.

In other words, after the exposure and development by the steps S3 and S4, the photo resist in the TFT area outside the passivation layer via 28, and the photo resist in the pixel area where the gaps 271 to be formed are removed. Therefore, the ITO film outside the passivation layer via 28 in the TFT area is revealed.

Figure 4C:
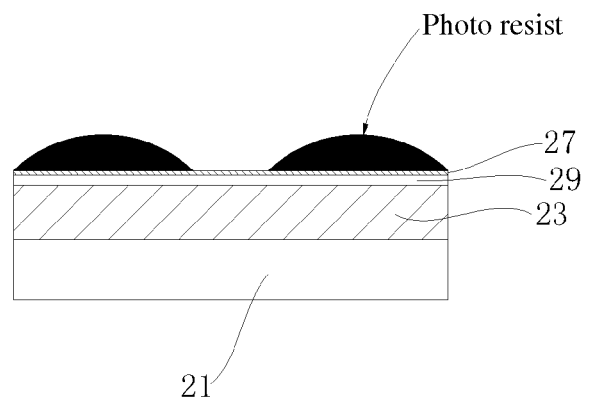

In step S5, a remaining photo resist on the gaps 271 in the to-be-formed ITO electrode pattern left from the step S4 is removed using a fourth dry etch, and the ITO film covered by the remaining photo resist is revealed. The state of the pixel area is shown in FIG. 4c.

Figure 4D:
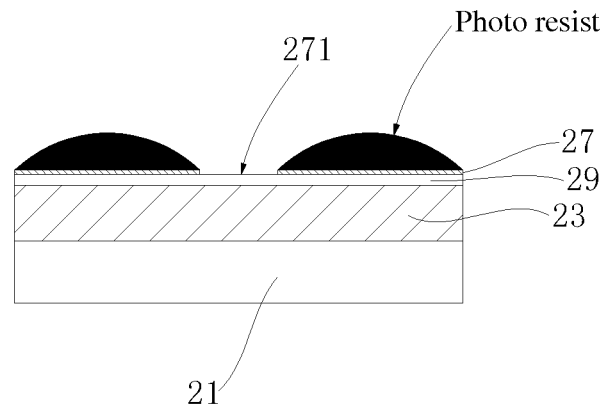

In step S6, the ITO film revealed by the steps S4 and S5 is removed using a third wet etch. The state of the pixel area is shown in FIG. 4d.

Figure 4E:
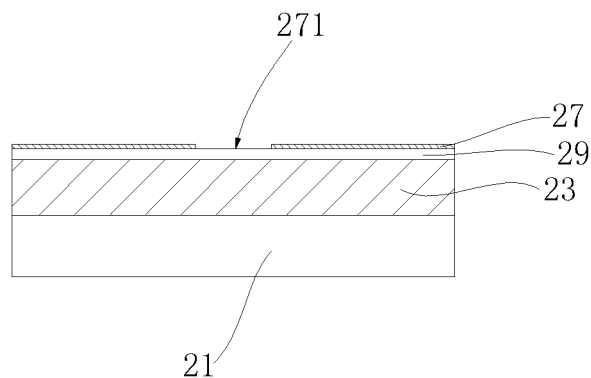

In step S7, the photo resist not exposed in the step S3 is removed to achieve the desired ITO electrode 27. The state of the pixel area is shown in FIG. 4e.

Compared to prior arts, the TFT-LCD array substrate produced by the foregoing steps has an additional dry etch process in the step forming the ITO electrode. The subsequent wet etches therefore are able to effectively reduce the gaps 271 in the ITO electrode pattern in the pixel area to about 1.9 µm, thereby enhancing the transmittance of the TFT-LCD array substrate and reducing the production cost.

The step S1 contains the following steps.

In step S1.1, a gate electrode metallic film is deposited on the glass substrate 21, and the gate electrode 22 is formed using gate mask exposure, development, a first wet etch, and peeling. In this step, the metallic material adopted can be Ta, MoTa, MoW, or Al.

In step S1.2, an insulator film, an amorphous silicon film, and a doped amorphous silicon film are sequentially deposited on the glass substrate 21 after the step S1.1. The gate electrode insulator layer 23, and the active layer containing the amorphous silicon layer 24 and the ohmic contact layer 25 (from the doped amorphous silicon film) are then formed using active layer mask exposure, development, a first dry etch, and peeling. In this step, the insulator film can be a single-layer film of SiNx or SiOx, or a composite film of SiNx and SiOx. The amorphous silicon film can be a-Si, and the doped amorphous silicon film can be n+a-Si.

In step S1.3, a source/drain electrode metallic film is deposited on the glass substrate 21 after the step S1.2. A source/drain electrode (metallic layer) 26 is then formed using source/drain electrode mask exposure, development, and a second wet etch, a second dry etch, and peeling. In this step, the metallic material adopted can be Mo or Al.

In step S1.4, the passivation layer 29 is deposited on the glass substrate 21 after the step S1.3. The passivation layer via 28 is then formed above the drain electrode 26b on the passivation layer 29 using passivation layer via mask exposure, development, a third dry etch, and peeling.

The step S1.1 can further contain the following steps.

In step S1.11, the gate electrode metallic film is deposited on the glass substrate 21 that is cleaned, and a photo resist is coated on the gate electrode metallic film.

In step S1.12, the photo resist coated on the gate electrode metallic film in the step S1.11 is exposed using a gate mask. In this step, the exposure uses UV ray. The part of the photo resist exposed to the UV ray would turn acid from neutral, and the other part not exposed to the UV ray would remain neutral.

In step S1.13, the photo resist exposed in the step S1.12 is developed so as to remove the part of the photo resist that is fully exposed (i.e., the part of the photo resist that turns acid from neutral). An alkaline developing solution is used to remove the part of the photo resist that is fully exposed, thereby revealing a part of the gate electrode metallic film that is outside where the gate electrode 22 is to be formed.

In step S1.14, a first wet etch is used to remove the extraneous gate electrode metallic film (i.e., the part of the gate electrode metallic film revealed by the step S1.13).

In step S1.15, the part of the photo resist not exposed to the UV ray in the step S1.12 is peeled and removed so as to obtain the desired gate electrode 22.

The step S1.2 can further contain the following steps.

In step S1.21, the insulator film, the amorphous silicon film, and the doped amorphous silicon film are sequentially deposited on the glass substrate 21 after the step S1.1. A photo resist is further coated on the doped amorphous silicon film.

In step S1.22, the photo resist coated on the doped amorphous silicon film in the step S1.21 is exposed using an active layer mask. In this step, the exposure uses UV ray. The part of the photo resist exposed to the UV ray turns acid from neutral, and the other part of the photo resist not exposed to the UV ray remains neutral. In this step, the part of the photo resist in the TFT area is not whereas the part of the photo resist in the pixel area is exposed to the UV ray.

In step S1.23, the photo resist exposed in the step S1.22 is developed so as to remove the part of the photo resist that is fully exposed (i.e., the part of the photo resist that turns acid from neutral). An alkaline developing solution is used to remove the part of the photo resist that is fully exposed, thereby revealing the doped amorphous silicon film in the pixel area.

In step S1.24, a first dry etch is used to remove the extraneous amorphous silicon film and doped amorphous silicon film (i.e., the doped amorphous silicon film revealed by the step S1.23 and the amorphous silicon film beneath it).

In step S1.25, the part of the photo resist not exposed to the UV ray in the step S1.22 is peeled and removed so as to obtain the desired gate electrode insulator layer 23 and the active layer containing the amorphous silicon layer 24 and the ohmic contact layer 25 (from the doped amorphous silicon film).

From the detailed steps of the step S1.2 described above, it should be understood that the gate electrode insulator layer 23 is only formed on the glass substrate 21 in the pixel area after the step S1.2.

The step S1.3 contains the following steps.

In step S1.31, the source/drain electrode metallic film is deposited on the glass substrate 21 after the step S1.2, and a photo resist is coated on the source/drain electrode metallic film.

In step S1.32, the photo resist coated on the source/drain electrode metallic film in the step S1.31 is exposed using a source/drain electrode mask. In this step, the exposure uses UV ray. The part of the photo resist exposed to the UV ray turns acid from neutral, and the other part of the photo resist not exposed to the UV ray remains neutral. In this step, the part of the photo resist above a ditch 30 in the TFT area and in the pixel area is whereas the part of the photo resist in the other area is not exposed to the UV ray.

In step S1.33, the photo resist exposed in the step S1.32 is developed so as to remove the part of the photo resist that is fully exposed (i.e., the part of the photo resist that turns acid from neutral). An alkaline developing solution is used to remove the part of the photo resist that is fully exposed, thereby revealing the source/drain electrode metallic film above where the ditch 30 is to be formed in the TFT area and the source/drain electrode metallic film in the pixel area.

In step S1.34, a second wet etch is used to remove the extraneous source/drain electrode metallic film (i.e., the source/drain electrode metallic film revealed by the step S1.33).

In step S1.35, a part of the doped amorphous silicon film and the amorphous silicon film beneath it in the ditch 30 is removed by a second dry etch so that the desired ditch 30 in the TFT area reaches the active layer.

In step S1.36, the part of the photo resist not exposed to the UV ray in the step S1.32 is peeled and removed so as to achieve the desired source electrode (metallic layer) 26a and drain electrode (metallic layer) 26b.

The step S1.4 can further contain the following steps.

In step S1.41, a passivation layer film is deposited on the glass substrate 21 after the step S1.3, and a photo resist is coated on the passivation layer film.

In step S1.42, the photo resist coated on the passivation layer film in the step S1.41 is exposed using a passivation layer via mask. In this step, the exposure uses UV ray. The part of the photo resist exposed to the UV ray turns acid from neutral, and the other part of the photo resist not exposed to the UV ray remains neutral. In this step, the part of the photo resist at where the passivation layer via 28 is to be formed is exposed to the UV ray, whereas the part of the photo resist in the other area is not exposed to the UV ray.

In step S1.43, the photo resist exposed in the step S1.42 is developed so as to remove the part of the photo resist that is fully exposed (i.e., the part of the photo resist that turns acid from neutral in the step S1.42). An alkaline developing solution is used to remove the part of the photo resist that is fully exposed, thereby revealing the passivation layer film outside where the passivation layer via 28 is to be formed.

In step S1.44, a third wet etch is used to remove the extraneous passivation layer film (i.e., the passivation layer film revealed by the step S1.43).

In step S1.45, a part of the photo resist not exposed to the UV ray in the step S1.42 is peeled and removed so as to achieve the desired passivation layer via 28.

From the detailed steps of the step S1.4 described above, it should be understood that, after the step S1.4, the gate electrode insulator layer 23 and the passivation layer 29 are formed on the pixel area's glass substrate 21. Then, from the described steps S2 to S7, it should be understood that the gate electrode insulator layer 23, the passivation layer 29, and the ITO electrode 27 are formed on the glass substrate 21.

Another embodiment of the present invention is described as follows. The difference from the previous embodiment is that the steps S1.2 and S1.3 in the previous embodiment's step S1 are combined into a single step.

The present embodiment's step S1 contains the following steps.

In step S2.1, a gate electrode metallic film is deposited on the glass substrate 21, and the gate electrode 22 is formed using gate mask exposure, development, a first wet etch, and peeling.

In step S2.2, an insulator film, an amorphous silicon film, a doped amorphous silicon film, and a source/drain electrode metallic film are sequentially deposited on the glass substrate 21 after the step S2.1. The gate electrode insulator layer 23, the active layer containing the amorphous silicon layer 24 and the ohmic contact layer 25 (from the doped amorphous silicon film), and the source electrode (metallic layer) 26a and drain electrode (metallic layer) 26b are then formed using SSM mask exposure, development, two dry etches, two wet etches, and peeling.

In step S2.3, the passivation layer 29 is deposited on the glass substrate 21 after the step S2.2. The passivation layer via 28 is then formed above the drain electrode 26b on the passivation layer 29 using passivation layer via mask exposure, development, a third dry etch, and peeling.

The step S2.2 contains the following steps.

In step S2.21, an insulator film, an amorphous silicon film, a doped amorphous silicon film, and a source/drain electrode metallic film are sequentially deposited on the glass substrate 21 after the step S2.1, and a photo resist is coated on the source/drain electrode metallic film.

In step S2.22, the photo resist coated on the source/drain electrode metallic film in the step S2.21 is exposed using a SSM mask. In this step, the exposure uses UV ray. The part of the photo resist exposed to the UV ray turns acid from neutral, and the other part of the photo resist not exposed to the UV ray remains neutral. Through the UV ray's interference and diffraction, a translucent pattern area is formed on the SSM mask. During exposure, UV ray can only partially penetrate the translucent area. By controlling the exposure, a part of the photo resist can be partially exposed, and some other part of the photo resist can be fully exposed. After development, the fully exposed area does not have photo resist, the partially exposed area has the photo resist thinner than that in a no exposure area. In this step, the part of the photo resist in the TFT area above the ditch 30 is partially exposed, and the other part of the photo resist in the TFT area is not exposed, and the part of the photo resist in the pixel area is fully exposed to the UV ray.

In step S2.23, the photo resist exposed in the step S2.22 is developed so as to remove the part of the photo resist that is exposed (i.e., the part of the photo resist that turns acid from neutral). An alkaline developing solution is used to remove the part of the photo resist that is exposed. The part of the photo resist not fully exposed is partially removed (the TFT area is still covered by photo resist but that over the not-fully-exposed area is thinner than that over the not-exposed area), and the source/drain electrode metallic film in the pixel area is revealed.

In step S2.24, a second wet etch is used to remove the extraneous source/drain electrode metallic film (i.e., the source/drain electrode metallic film revealed by the step S2.23).

In step S2.25, based on the result achieved by the step S2.24, a first dry etch is used to remove the part of the photo resist not fully exposed so as to reveal the source/drain electrode metallic film covered by the not-fully-exposed photo resist.

In step S2.26, based on the result achieved by the step S2.25, a third wet etch is used to remove the source/drain electrode metallic film revealed by the step S2.25 so as to reveal the doped amorphous silicon film covered by the revealed source/drain electrode metallic film.

In step S2.27, based on the result achieved by the step S2.26, a second dry etch is used to remove the doped amorphous silicon film revealed by the step S2.26 and to remove a part of the amorphous silicon film covered by the revealed doped amorphous silicon film so as to achieve the ditch 30 in the TFT area.

In step S2.28, the part of the photo resist not exposed to the UV ray in the step S2.22 is peeled and removed so as to achieve the gate electrode insulator layer 23, the active layer containing the amorphous silicon layer 24 and the ohmic contact layer 25 (from the doped amorphous silicon film), the source electrode 26a, and drain electrode 26b.

Figure 5:
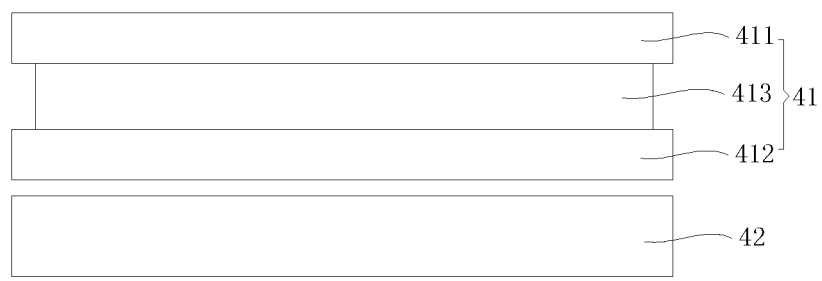
FIG. 5 is a schematic diagram showing a LCD device having a TFT-LCD array substrate of FIG. 1.

The TFT-LCD array substrate produced by the above embodiments is often used in LCD devices, as shown in FIG. 5.

FIG. 5 is a schematic diagram showing a LCD device having a TFT-LCD array substrate of FIG. 1.

As illustrated, the LCD device contains a LCD panel 41 and a backlight module 42 opposing the LCD panel 41. The backlight module 42 provides illumination to the LCD panel 41 so that the LCD panel 41 is able to manifest images. The LCD panel 41 contains a first substrate 411 which is a TFT-LCD array substrate produced by an above-described embodiment, a second substrate 412 which is a color filter substrate, a liquid crystal layer 413 sandwiched between the first and second substrates 411 and 412, which are oppositely positioned.

The second substrate 412, opposing the first substrate 411, is also called a CF (Color Filter) substrate. It usually contains a transparent substrate (e.g., a glass substrate), a black array pattern on the transparent substrate, a color layer (with red, green, and blue color filter patterns), and an alignment layer, etc. Since the second substrate 412 is the same as the color filter substrate of existing LCD devices, the specific details of the second substrate 412 can be referred to the existing technique and therefore are omitted here. Similarly, the backlight module 42 is also identical to the backlight module of existing LCD device. The specific details of the backlight module 42 can be referred to the existing technique and therefore are omitted here.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A TFT-LCD array substrate manufacturing method comprising the steps of:
    a) forming a gate electrode, a gate electrode insulator layer, an active layer comprising an amorphous silicon layer and an ohmic contact layer, a source electrode and a drain electrode on top of the active layer, a passivation layer, and a passivation layer via on top of the drain electrode sequentially on a glass substrate;
    b) depositing an ITO film on the glass substrate processed by the step a), coating a photo resist on the ITO film;
    c) exposing the photo resist on the ITO film using an ITO mask and UV ray so that, in a TFT area, the photo resist coated in the passivation layer via and its vicinity is not exposed, and the photo resist coated in the other part is fully exposed and, in a pixel area, the photo resist coated on a desired ITO electrode is not exposed, and the photo resist coated on gaps to be formed among the ITO electrode is partially exposed, where the ITO mask is one of a single slit mask (SSM), a gray tone mask, and a half tone mask;
    d) developing and removing the photo resist in the TFT area outside the passivation layer via and a part of the photo resist in the pixel area where gaps are to be formed so as to reveal the ITO film outside the passivation layer via in the TFT area;
    e) removing a remaining photo resist in the pixel area where gaps are to be formed from the step d) using a fourth dry etch, so that the ITO film on the gaps to be formed is revealed;
    f) removing the ITO film revealed by the steps d) and e) using a third wet etch so that the gaps are no more than 1.9 μm; and
    g) peeling the photo resist not yet removed, and forming an ITO electrode that is connected to the passivation layer via.

2. The TFT-LCD array substrate manufacturing method as claimed in claim 1, wherein the step a) comprises:
    a1) depositing a gate electrode metallic film on the glass substrate, and forming the gate electrode using exposure, development, a first wet etch, and peeling;
    a2) depositing an insulator film, an amorphous silicon film, and a doped amorphous silicon film sequentially on the glass substrate processed after the step a1), and forming the gate electrode insulator layer and the active layer comprising the amorphous silicon layer and the ohmic contact layer using exposure, development, a first dry etch, and peeling;
    a3) depositing a source/drain electrode metallic film on the glass substrate processed after the step a2), and forming the source electrode and the drain electrode using exposure, development, and a second wet etch, a second dry etch, and peeling; and
    a4) depositing the passivation layer on the glass substrate processed after the step a3), and forming the passivation layer via above the drain electrode on the passivation layer using exposure, development, a third dry etch, and peeling.

3. The TFT-LCD array substrate manufacturing method as claimed in claim 2, wherein the step a1) comprises:
- a11) depositing the gate electrode metallic film on the glass substrate that is cleaned, and coating a photo resist on the gate electrode metallic film;
- a12) exposing and developing the photo resist coated on the gate electrode metallic film in the step a11), and revealing a part of the gate electrode metallic film that is outside where the gate electrode is to be formed;
- a13) removing the part of the gate electrode metallic film revealed by the step a12) using the first wet etch; and
- a14) peeling and removing a part of the photo resist that is at where the gate electrode is to be formed, and forming the gate electrode.

4. The TFT-LCD array substrate manufacturing method as claimed in claim 2, wherein the step a2) comprises:
- a21) depositing the insulator film, the amorphous silicon film, and the doped amorphous silicon film sequentially on the glass substrate processed after the step a1), and coating a photo resist on the doped amorphous silicon film;
- a22) exposing and developing the photo resist coated on the doped amorphous silicon film in the step a21), and revealing the doped amorphous silicon film in the pixel area;
- a23) removing the revealed doped amorphous silicon film in the pixel area and the amorphous silicon film beneath it; and
- a24) peeling and removing a part of the photo resist that is in the TFT area, and forming the gate electrode insulator layer and the active layer comprising the amorphous silicon layer and the ohmic contact layer.

5. The TFT-LCD array substrate manufacturing method as claimed in claim 4, wherein the step a3) comprises:
- a31) depositing the source/drain electrode metallic film on the glass substrate processed after the step a2), and coating a photo resist on the source/drain electrode metallic film;
- a32) exposing and developing the photo resist coated on the source/drain electrode metallic film in the step a31), and revealing the source/drain electrode metallic film above where a ditch is to be formed and the source/drain electrode metallic film in the pixel area;
- a33) removing the source/drain electrode metallic film revealed by the step a32) using the second wet etch;
- a34) removing a part of the doped amorphous silicon film and the amorphous silicon film beneath it in the to-be-formed ditch using the second dry etch so that the to-be-formed ditch reaches the amorphous silicon layer; and
- a35) peeling and removing a part of the photo resist that is at where the ditch is to be formed in the TFT area, and forming the source electrode and the drain electrode.

6. The TFT-LCD array substrate manufacturing method as claimed in claim 2, wherein the step a3) comprises:
- a31) depositing the source/drain electrode metallic film on the glass substrate processed after the step a2), and coating a photo resist on the source/drain electrode metallic film;
- a32) exposing and developing the photo resist coated on the source/drain electrode metallic film in the step a31), and revealing the source/drain electrode metallic film above where a ditch is to be formed and the source/drain electrode metallic film in the pixel area;
- a33) removing the source/drain electrode metallic film revealed by the step a32) using the second wet etch;
- a34) removing a part of the doped amorphous silicon film and the amorphous silicon film beneath it in the to-be-formed ditch using the second dry etch so that the to-be-formed ditch reaches the amorphous silicon layer; and
- a35) peeling and removing a part of the photo resist that is at where the ditch is to be formed in the TFT area, and forming the source electrode and the drain electrode.

7. The TFT-LCD array substrate manufacturing method as claimed in claim 2, wherein the step a4) comprises:
- a41) depositing a passivation layer film on the glass substrate processed after the step a3), and coating a photo resist on the passivation layer film;
- a42) exposing and developing the photo resist coated on the passivation layer film in the step a41), and revealing the passivation layer film outside where the passivation layer via is to be formed;
- a43) removing the passivation layer film revealed by the step a42) using the third dry etch; and
- a44) peeling and removing a part of the photo resist that is outside where the passivation layer via is to be formed, and forming the passivation layer via.

8. The TFT-LCD array substrate manufacturing method as claimed in claim 1, wherein the step a) comprises:
- a1) depositing a gate electrode metallic film on the glass substrate, and forming the gate electrode using exposure, development, a first wet etch, and peeling;
- a3) depositing an insulator film, an amorphous silicon film, a doped amorphous silicon film, and a source/drain electrode metallic film sequentially on the glass substrate processed after the step a1), and forming the gate electrode insulator layer, the active layer comprising the amorphous silicon layer and the ohmic contact layer, the source electrode, and the drain electrode using exposure, development, a second wet etch, a first dry etch, a third wet etch, a second dry etch, and peeling; and
- a4) depositing the passivation layer on the glass substrate processed after the step a3), and forming the passivation layer via above the drain electrode on the passivation layer using exposure, development, a third dry etch, and peeling.

9. The TFT-LCD array substrate manufacturing method as claimed in claim 8, wherein the step a1) comprises:
- a11) depositing the gate electrode metallic film on the glass substrate that is cleaned, and coating a photo resist on the gate electrode metallic film;
- a12) exposing and developing the photo resist coated on the gate electrode metallic film in the step a11), and revealing a part of the gate electrode metallic film that is outside where the gate electrode is to be formed;
- a13) removing the part of the gate electrode metallic film revealed by the step a12) using the first wet etch; and
- a14) peeling and removing a part of the photo resist that is at where the gate electrode is to be formed, and forming the gate electrode.

10. The TFT-LCD array substrate manufacturing method as claimed in claim 8, wherein the step a3) comprises:
- a31) depositing the insulator film, the amorphous silicon film, and the doped amorphous silicon film sequentially on the glass substrate processed after the step a1), and coating a photo resist on the doped amorphous silicon film;
- a32) exposing and developing the photo resist coated on the doped amorphous silicon film in the step a31), removing a part of the photo resist at where a ditch is to be formed, removing the entire photo resist in the pixel area, and revealing the source/drain electrode metallic film in the pixel area;

a33) removing the source/drain electrode metallic film revealed by the step a32) using the second wet etch;

a34) removing the photo resist that is at which the ditch is to be formed remained from the step a32) using the first dry etch, and revealing the source/drain metallic film at where the ditch is to be formed;

a35) removing the source/drain metallic film revealed by the step a34) using the third wet etch, and revealing the doped amorphous silicon film at where the ditch is to be formed;

a36) removing a part of the doped amorphous silicon film and the amorphous silicon film beneath it revealed in the step a35) using the second dry etch so that the to-be-formed ditch reaches the amorphous silicon layer; and a37) peeling and removing a part of the photo resist that is outside where the ditch is to be formed in the TFT area, and forming the gate electrode insulator layer, the active layer comprising the amorphous silicon layer and the ohmic contact layer, the source electrode, and the drain electrode.

11. The TFT-LCD array substrate manufacturing method as claimed in claim 8, wherein the step a4) comprises:

a41) depositing a passivation layer film on the glass substrate processed after the step a3), and coating a photo resist on the passivation layer film;

a42) exposing and developing the photo resist coated on the passivation layer film in the step a41), and revealing the passivation layer film outside where the passivation layer via is to be formed;

a43) removing the passivation layer film revealed by the step a42) using the third dry etch; and a44) peeling and removing a part of the photo resist that is outside where the passivation layer via is to be formed, and forming the passivation layer via.

12. A LCD panel comprising a TFT-LCD array substrate, a Color Filter substrate opposing the TFT-LCD array substrate, and a liquid crystal layer sandwiched between the TFT-LCD array substrate and the Color Filter substrate; wherein the TFT-LCD array substrate is produced according to the TFT-LCD array substrate manufacturing method as claimed in claim 1.

13. A LCD device comprising a LCD panel, and a backlight module opposing the LCD panel and providing illumination for the LCD panel's manifestation of images; wherein the LCD panel is as claimed in claim 12.

* * * * *